(12) United States Patent
Rohrer

(10) Patent No.: US 9,195,269 B2
(45) Date of Patent: Nov. 24, 2015

(54) SYSTEM AND METHOD FOR MITIGATING SHOCK FAILURE IN AN ELECTRONIC DEVICE

(71) Applicant: Nvidia Corporation, Santa Clara, CA (US)

(72) Inventor: Daniel Rohrer, Sata Clara, CA (US)

(73) Assignee: Nvidia Corporation, Santa Clara, CA (US)

( * ) Notice: Subject to any disclaimer, the term of this patent is extended or adjusted under 35 U.S.C. 154(b) by 283 days.

(21) Appl. No.: 13/851,447

(22) Filed: Mar. 27, 2013

(65) Prior Publication Data

US 2014/0295910 A1    Oct. 2, 2014

(51) Int. Cl.
*G06F 1/16* (2006.01)
*H04M 1/18* (2006.01)

(52) U.S. Cl.
CPC ............. *G06F 1/1633* (2013.01); *H04M 1/185* (2013.01); *H04M 2250/12* (2013.01)

(58) Field of Classification Search
CPC ....... G06F 1/16; G06F 1/1633; G06F 3/0346; G01C 19/5719; G01P 15/0802; G01P 15/00; H04M 1/00; H04M 1/02; H04M 1/0202; H04M 2250/12; H04M 1/185; H04M 2250/00; G11B 19/043; G11B 3/10; G11B 3/14; G01V 7/00; G01V 7/14
USPC ........ 455/67.11, 414.1–414.2, 418, 423, 425, 455/514, 550.1, 556.1–556.2, 558, 575.1, 455/575.8; 726/34; 340/539.22, 545.5, 621; 73/488–491, 495, 503, 504.03
See application file for complete search history.

(56) References Cited

U.S. PATENT DOCUMENTS

| | | | | |
|---|---|---|---|---|
| 4,745,564 | A * | 5/1988 | Tennes et al. | 702/141 |
| 7,059,182 | B1 * | 6/2006 | Ragner | 73/200 |
| 8,212,422 | B2 | 7/2012 | Chen et al. | |
| 2004/0125493 | A1 * | 7/2004 | Shimotono et al. | 360/75 |
| 2006/0116848 | A1 * | 6/2006 | Clifford | G01P 15/0891 702/141 |
| 2006/0152842 | A1 * | 7/2006 | Pasolini | G01P 15/0891 360/75 |
| 2007/0188969 | A1 * | 8/2007 | Lasalandra et al. | 361/160 |
| 2007/0282564 | A1 * | 12/2007 | Sprague et al. | 702/141 |
| 2010/0321194 | A1 * | 12/2010 | Yang et al. | 340/669 |
| 2011/0194230 | A1 | 8/2011 | Hart et al. | |
| 2011/0205076 | A1 * | 8/2011 | Wulff et al. | 340/686.1 |
| 2012/0262541 | A1 | 10/2012 | Hollinger | |
| 2013/0054656 | A1 * | 2/2013 | Conroy | 707/821 |
| 2013/0120147 | A1 * | 5/2013 | Narasimhan | G01P 15/00 340/573.1 |
| 2013/0257582 | A1 * | 10/2013 | Rothkopf | G06F 1/1656 340/3.1 |
| 2014/0253284 | A1 * | 9/2014 | Peterson | H04M 1/185 340/3.1 |

FOREIGN PATENT DOCUMENTS

| | | |
|---|---|---|
| DE | 102009047363 A1 | 6/2011 |
| TW | 201116989 A | 5/2011 |
| WO | 0229812 A2 | 4/2002 |
| WO | 2009140990 A1 | 11/2009 |

OTHER PUBLICATIONS

Translation of German Office Action dated Oct. 23, 2014, Applicant: Nvidia Corporation, 7 pages.

* cited by examiner

*Primary Examiner* — Meless Zewdu

(57) ABSTRACT

A roll compensation system for an electronic device, a method of mitigating impact of an electronic device and an impact-resistant mobile device incorporating the system or the method. In one embodiment, the system includes: (1) a plurality of sensors operable to detect orientation and motion of the electronic device, (2) a controller configured to detect a fall based on the motion and determine a mitigating roll based on the orientation and the motion and (3) a compensator operable to carry out the mitigating roll thereby reducing the probability of a catastrophic impact.

6 Claims, 2 Drawing Sheets

SYSTEM AND METHOD FOR MITIGATING SHOCK FAILURE IN AN ELECTRONIC DEVICE

TECHNICAL FIELD

This application is directed, in general, to electronic devices and, more specifically, to a system and method for mitigating shock failure in an electronic device.

BACKGROUND

Mobile electronic devices are frequently returned to their manufacturers due to catastrophic failures caused by drops. A common malady of dropped devices is a broken display or touch screen component. These glass failures are a significant expense on the mobile electronics industry, an expense that most consumers have or will experience at some point in time.

Consumers often resort to protective accessories for their mobile devices, including: so-called "ruggedized" cases, hard-sided shells and soft, impact-absorbing shells. Protective accessories generally suffice when it comes to shielding the glass of a device from impact.

SUMMARY

A roll compensation system for an electronic device, a method of mitigating impact of an electronic device and an impact-resistant mobile device incorporating the system or the method. In one embodiment, the system includes: (1) a plurality of sensors operable to detect orientation and motion of the electronic device, (2) a controller configured to detect a fall based on the motion and determine a mitigating roll based on the orientation and the motion and (3) a compensator operable to carry out the mitigating roll thereby reducing the probability of a catastrophic impact.

Another aspect provides a method of mitigating impact of an electronic device. In one embodiment, the method includes: (1) detecting a state of free-fall, (2) estimating a terminal orientation based on a measured orientation and rotation of the electronic device, (3) determining a mitigated terminal orientation and (4) accelerating a mass to achieve the mitigated terminal orientation.

Yet another aspect provides an impact-resistant mobile device. In one embodiment, the device includes: (1) an outer shell, (2) a plurality of sensors operable to detect orientation and motion of the outer shell, (3) a memory configured to store an initial height of the impact-resistant mobile device, (4) a controller operable to gain access to the memory and configured to: (4a) detect a fall based on a detected motion, (4b) estimate a projected terminal orientation and impact surface of the outer shell based on the initial height, the detected motion and a detected orientation and (4c) determine a mitigating roll based on the projected terminal orientation and impact surface and (5) an electrically actuated compensator controlled by the controller and operable to carry out the mitigating roll thereby reducing the probability of an impact catastrophic to the impact-resistant mobile device.

BRIEF DESCRIPTION

Figure 1:
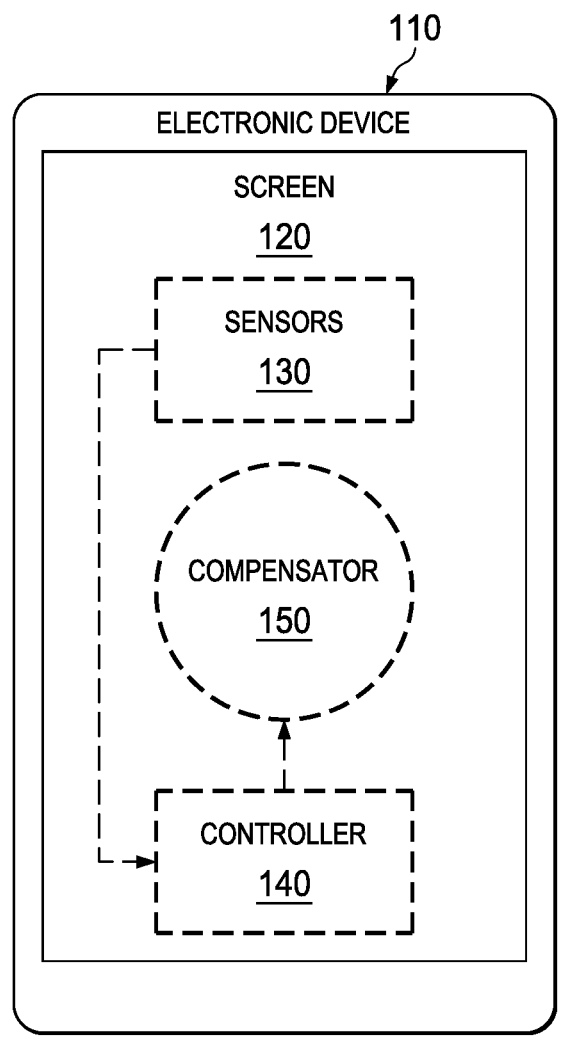
Figure 2:
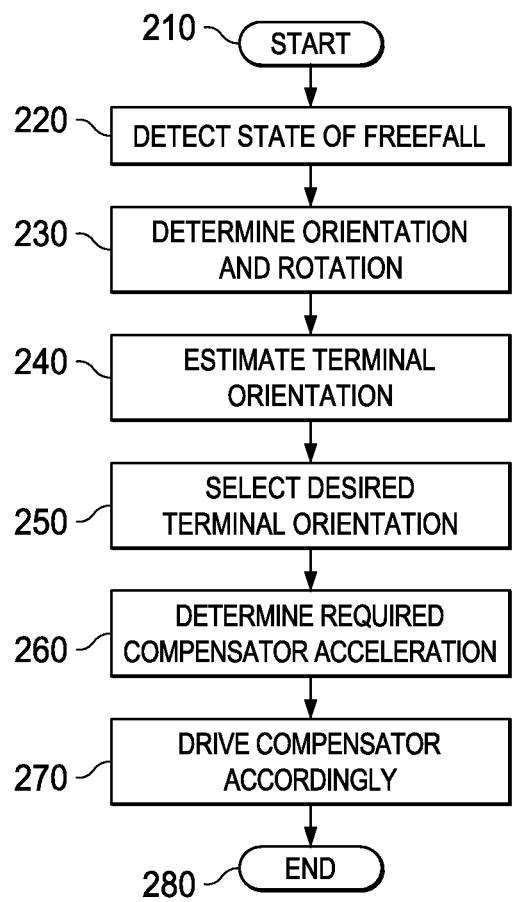

Reference is now made to the following descriptions taken in conjunction with the accompanying drawings, in which:

FIG. 1 is a diagram of one embodiment of an electronic device incorporating a system or method for mitigating shock failure therein; and FIG. 2 is a block diagram of one embodiment of a method of mitigating shock failure in an electronic device.

DETAILED DESCRIPTION

It is realized herein that a reduction in the quantity of catastrophic failures of electronic devices due to drops translates to potentially significant cost savings in refurbishments. Glass display and touch screen component failures are very common with drops. It is realized herein that drops can be mitigated without additional padding, hard-side cases or protective shells. It is realized herein that impacts on certain points of electronic devices are statistically more catastrophic than others. For example, a corner impact is more likely to cause catastrophic failure than a full-edge impact. Likewise, an impact on the display is more likely catastrophic than an impact on the opposite back shell. Catastrophic failures may not be entirely eliminated, but a reduction in the likelihood of a catastrophic failure yields savings when applied over hundreds of thousands or even millions of electronic devices.

Many modern electronic devices employ motion sensors for a variety of purposes, including user input and video output orientation. It is realized herein that these same sensors may be employed to detect and mitigate a free-fall. The sensors are capable of generating orientation and acceleration data sufficient to detect the fall, predict an impact and influence the dynamics of the remaining duration of the fall. It is realized herein that catastrophic impacts can be mitigated with a roll compensation calculated to bring about a full-edge strike as opposed to a corner strike. Robust surfaces of the electronic device can be favored in a free-fall and the more sensitive surfaces protected. It is further realized herein the roll compensation can be achieved by an electrically actuated mass coupled to the electronic device. Precise actuation of the mass can generate the necessary accelerations (e.g., manipulations) to effectively dictate the impact point on the electronic device.

An alternative embodiment employs an active response that is not mass-based. For example, one or more air bags or edge cushions could deploy automatically upon detection of a fall to cushion the landing.

Having generally described mitigation of shock due to dropping an electronic device, various embodiments of the system or method for mitigating shock failure introduced herein will be described.

FIG. 1 is a diagram of one embodiment of an electronic device 110 incorporating a system or method for mitigating shock failure therein. Electronic device 110 includes a screen 120 and a roll compensation system having sensors 130, a controller 140 and a compensator 150. Electronic device 110 may, in certain embodiments, be a cellular phone or tablet computing device. In other embodiments, electronic device 110 is a hand-held digital media device, such as an MP3 player. Many modern devices employ screen 120 as a primary user interface, often employing touch-screen capability and adding to the criticality of a glass failure.

Sensors 130 are coupled to controller 140 and are configured to detect orientation of and accelerations along three orthogonal axis. As electronic device 110 enters into a free-fall, gravitational accelerations are induced over a period of time. Sensors 130 measure the accelerations and the free-fall is recognized. Upon the recognition, controller 140 makes a determination of an initial orientation and rotation of electronic device 110. The determination is based on orientation and acceleration data generated by sensors 130. Given the initial orientation and rotation (and, in some embodiments, an assumed initial height of the free-fall), controller 140 projects what the orientation of electronic device 110 will be upon impact, otherwise known as a terminal orientation. In certain embodiments, the assumed initial height is configurable by user input, while in others initial height is derived from collected data from previous free-falls and impacts.

The terminal orientation may indicate an impact point that is statistically more catastrophic than others. For instance, impacts on a corner of electronic device 110 deliver a larger shock to screen 120 making it more likely the glass or touch screen components of screen 120 break. Conversely, if the impact point is a full edge of electronic device 110, the shock is more likely to be dampened and absorbed, and more likely that screen 120 survives the impact. In one embodiment, a manufacturer models for a particular device an "optimal" strike orientation based on a knowledge of component and material properties and assembly data, such as solder stress, plastic brittleness, attachment strength and adhesive shear strength.

Given the projected terminal orientation, controller 140 determines a statistically more favorable terminal orientation such that the impact point is less likely to cause a catastrophic failure of screen 120 or electronic device 110 as a whole. The favored terminal orientation will be achievable by a roll compensation carried out by compensator 150. In some embodiments, controller 140 calculates accelerations and moments necessary to generate the desired roll compensation. In some scenarios the desired roll compensation accelerates the roll induced by the free-fall. In other scenarios the desired roll compensation decelerates the roll induced by the free-fall. By either speeding or slowing the rotation of electronic device 110, the terminal orientation is changed and provides for a statistically more survivable impact.

In some embodiments, compensator 150 is an electrically actuated mass that is coupled to and controlled by controller 140. In the embodiment of FIG. 1, compensator 150 includes a massive disk as a rotor configured to rotate about one axis of electronic device 110. The massive disk configuration allows for two-dimensional roll compensation. Alternate embodiments may provide for three-dimensional roll compensation by employing an electrically actuated massive sphere or a second, orthogonally oriented massive disk.

In other embodiments, battery cells may be used as a moveable mass in lieu of a dedicated mass as just described. Accordingly, one or more batteries may be movably mounted such that various moments could be induced into them to provide roll compensation. In principle, anything that could be moved "far enough" or "fast enough" with "sufficient mass" can be employed. It will be apparent to those skilled in the pertinent art that the more mass or acceleration, the greater the response can be.

In the embodiment of FIG. 1, controller 140 commands compensator 150 to accelerate the massive disk to generate a moment about the axis of rotation. This moment, over time, is calculated to manifest as roll compensation, which statistically mitigates the free-fall and impending impact.

In certain embodiments, a mass is accelerated (manipulated) such that a falling, spinning, electronic device can be reoriented and stabilized at a desired orientation. Such embodiments may employ an active, perhaps continuous, feedback control loop operable to adjust, moment by moment, the massive disk such that the electronic device reaches a target orientation. Thus, one should understand that the teachings herein do not preclude repeatedly reassessing and adaptively changing orientation such that reorientation is at least a continual and active process.

FIG. 2 is a flow diagram of one embodiment of a method of mitigating shock failure in an electronic device. The method begins at a start step 210. At a step 220, the electronic device is detected to be in a state of free-fall. Upon this detection, an initial orientation and rotation of the electronic device is determined at a step 230. Given the determine initial orientation and rotation, an orientation at impact, or terminal orientation, is determined at a step 240. Estimating the terminal orientation requires knowledge or an assumption of a height of the fall. The height may, in certain embodiments be retrieved from data collected during previous falls. Alternatively, the height may be configured by a user or manufacturer of the electronic device.

At a step 250, the estimated terminal orientation is employed in determining a desired terminal orientation that is calculated to be statistically less catastrophic than the estimated terminal orientation. This determination is based on the achievability of the desired terminal orientation with respect to its proximity to the estimated terminal orientation, an estimated duration of the fall and the speed with which the rotation of the electronic device can be controlled and ultimately accelerated or decelerated. A necessary compensating acceleration is determined at a step 260. The compensating acceleration is then translated to a command for a compensator that is driven accordingly at a step 270. The acceleration of the compensator is calculated to either slow or speed the rotation of the electronic device, thus achieving the desired terminal orientation. The method then ends at a step 280.

Those skilled in the art to which this application relates will appreciate that other and further additions, deletions, substitutions and modifications may be made to the described embodiments.

What is claimed is:

1. An impact-resistant mobile device, comprising:
an outer shell;
a plurality of sensors operable to detect orientation and motion of said outer shell;
a memory configured to store an initial height of said impact-resistant mobile device;
a controller operable to gain access to said memory and configured to:
detect a fall of the impact-resistant mobile device based on said detected orientation and motion,
estimate a projected terminal orientation and impact surface of said outer shell based on said initial height, said detected motion and the detected orientation, and
determine a mitigating roll based on said projected terminal orientation and impact surface; and
an electrically actuated compensator controlled by said controller and operable to carry out said mitigating roll thereby reducing the probability of an impact catastrophic to said impact-resistant mobile device.

2. The impact-resistant mobile device recited in claim 1 wherein said plurality of sensors is a plurality of accelerometers.

3. The impact-resistant mobile device recited in claim 1 wherein said mitigating roll is further based on said initial height.

4. The impact-resistant mobile device recited in claim 1 further comprising a feedback module configured to:
determine actual terminal parameters of said fall;
calculate a new initial height; and
gain access to said memory for storing said new initial height.

5. The impact-resistant mobile device recited in claim 1 wherein said electrically actuated compensator is a massive disk operable to generate a moment about a gimbal of said massive disk.

6. The impact-resistant mobile device recited in claim 1 wherein said impact-resistant mobile device is a tablet computer.

\* \* \* \* \*